United States Patent [19]
Kivett

[11] Patent Number: 5,428,603
[45] Date of Patent: Jun. 27, 1995

[54] SYNCHRONOUS TIME DIVISION MULTIPLE ACCESS INTERROGATE-RESPOND DATA COMMUNICATION NETWORK

[75] Inventor: James A. Kivett, Carson, Calif.

[73] Assignee: Hughes Aircraft Company, Los Angeles, Calif.

[21] Appl. No.: 122,866

[22] Filed: Sep. 15, 1993

Related U.S. Application Data

[63] Continuation-in-part of Ser. No. 63,097, May 17, 1993.

[51] Int. Cl.$^6$ ............................................. H04B 1/56
[52] U.S. Cl. .................................. 370/24; 370/95.1; 370/85.1; 370/18
[58] Field of Search ............... 370/94.2, 94.1, 85.1, 370/85.8, 85.13, 29, 95.1, 95.2, 18, 24, 100.1, 105.1

[56] References Cited

U.S. PATENT DOCUMENTS

| | | | |
|---|---|---|---|
| 4,754,450 | 6/1988 | Lynk, Jr. et al. | 370/29 |
| 4,918,609 | 4/1990 | Yamawaki | 364/449 |
| 4,940,974 | 7/1990 | Sojka | 370/95.2 |
| 5,084,872 | 1/1992 | Le Cucq et al. | 370/85.1 |
| 5,111,452 | 5/1992 | Kyuma | 370/85.1 |

OTHER PUBLICATIONS

Sections 4 and 5 of "Scientific and Technical Report—System Technical Description of the Enhanced Position Location Reporting System (EPLRS), Low Rate Initial Production (LRIP) Program", Hughes Aircraft Company, Fullerton, Calif., 26 Feb. 1993.
Part IV of the "NATO AGARDograph No. 314, Analysis, Design and Synthesis Methods for Guidance and Control Systems," C. T. Leondes, editor, Jun., 1990.

Primary Examiner—Douglas W. Olms
Assistant Examiner—Ajit Patel
Attorney, Agent, or Firm—W. K. Denson-Low

[57] ABSTRACT

A communication network and method employing chained sequences of communications devices, to support synchronized relaying of data, thus forming duplex data buses. These data buses support both synchronous virtual circuits and a form of synchronized interrogate-respond data transfer. Off-bus communications devices are permitted to synchronously respond onto the bus without time contention.

24 Claims, 5 Drawing Sheets

FIG. 5.

| NODE LEVEL | WINDOW NUMBERS | | | | | | | |
|---|---|---|---|---|---|---|---|---|
| | 0 | 4 | 2 | 6 | 1 | 5 | 3 | 7 |
| 12 | Td | Td | Td | Td | Td | Td | Td | Td |
| 11 | R | R | R | R | R | R | R | R |
| 10 | R | R | R | R | Tu | Tu | Tu | Tu |
| 9 | R | R | R | R | Td | Td | Td | Td |
| 8 | R | R | R | R | R | R | R | R |
| 7 | R | R | Tu | Tu | R | R | R | R |
| 6 | R | R | Td | Td | R | R | R | R |
| 5 | R | R | R | R | R | R | Tu | Tu |
| 4 | R | R | R | R | R | R | Td | Td |
| 3 | R | R | R | R | R | R | R | R |
| 2 | R | R | R | R | R | R | R | R |
| 1 | Tu | Tu | Tu | Tu | Tu | Tu | Tu | Tu |

FIG. 6.

| NODE LEVEL | WINDOW NUMBERS | | | | | | | |
|---|---|---|---|---|---|---|---|---|
| | 0 | 4 | 2 | 6 | 1 | 5 | 3 | 7 |
| 12 | Td | Td | Td | Td | Td | Td | Td | Td |
| 11 | R | R | R | R | R | R | R | R |
| 10 | R | R | R | R | Tu | Tu | Tu | Tu |
| 9 | R | R | R | R | Td | Td | Td | Td |
| 8 | R | R | R | R | R | R | R | R |
| 7 | R | R | Tu | Tu | R | R | R | R |
| 6 | R | R | Td | Td | R | R | R | R |
| 5 | R | R | R | R | R | R | Tu | Tu |
| 4 | R | R | R | R | R | R | Td | Td |
| 3 | R | R | R | R | R | R | R | R |
| 2 | R | R | R | R | R | R | R | R |
| 1 | Tu | Tu | Tu | Tu | Tu | Tu | Tu | Tu |

SYNCHRONOUS TIME DIVISION MULTIPLE ACCESS INTERROGATE-RESPOND DATA COMMUNICATION NETWORK

RELATED APPLICATION

This application is a continuation-in-part of commonly assigned, pending application Ser. No. 08/063,097, entitled TRAIN LOCATION AND CONTROL USING SPREAD SPECTRUM RADIO COMMUNICATIONS, filed May 17, 1993, the entire contents of which are incorporated herein by this reference.

FIELD OF THE INVENTION

This invention relates to data communications networks, and more particularly to a network employing chained sequences of communications devices to form a duplex data bus.

BACKGROUND OF THE INVENTION

Asynchronous interrogate-respond ("I-R") networks are in use for such applications as test range monitoring, but these networks are generally limited to a single level of relay from the control station. For those applications where a single level relaying is insufficient, this invention will provide multiple levels of relaying, in a very efficient manner.

Synchronous time-slotted systems such as the Position Location Reporting System (PLRS) and the Joint Tactical Information Distribution System (JTIDS) in use by the U.S. military provide both communications and position location, but these existing systems do not adapt well to control applications where rapid shifts in control loading are needed.

SUMMARY OF THE INVENTION

A data communications network is described, which includes a network of communications devices for communication over a communications medium. The devices are spatially separated and arranged along a communication bus. Each device on the bus includes a real time clock. The network includes means for maintaining time synchronization among the devices.

An arrangement of coordinated time slot functional assignments is provided, wherein a predetermined communication device may either send or receive a data packet during a given time slot. The network propagates data packets along the bus in either direction by sequentially relaying a data packet from one device to an adjacent device during a first time slot, and relays the data packet from this adjacent device to another device next in order during a subsequent time slot. The time slot structure is such that data packet flow occurs in both directions along the bus in a time interleaved manner to form a duplex data flow.

In accordance with another aspect of the invention, a method is described for data communications in a network of communication devices spatially separated and arranged on a data bus, comprising a sequence of the following steps:

providing a network of communications devices, each capable of transmitting and receiving data packets on the bus, each device including a real time clock;

maintaining time synchronization among the real time clocks of the devices;

assigning particular time slots to the communication devices within a coordinated time slot structure, wherein a predetermined communications device may either send or receive a data packet during a given time slot, the time slot assignments designed to permit a data packet to be relayed by the devices along the bus in either direction in chained sequence;

propagating data packets along the bus in either direction by sequentially relaying the data packet from one device to an adjacent device during a first time slot, and relaying the data packet from the adjacent device to another device next in order during a subsequent time slot, wherein data packet flow occurs in both directions along the bus in a time interleaved manner to form a duplex data flow along the bus.

BRIEF DESCRIPTION OF THE DRAWING

These and other features and advantages of the present invention will become more apparent from the following detailed description of an exemplary embodiment thereof, as illustrated in the accompanying drawings, in which:

FIG. 5 illustrates an exemplary functional window allocation for a network embodying the invention.

FIG. 6 shows exemplary relay and terminal window assignments for a network embodying the invention.

DETAILED DESCRIPTION OF THE PREFERRED EMBODIMENT

Figure 1:
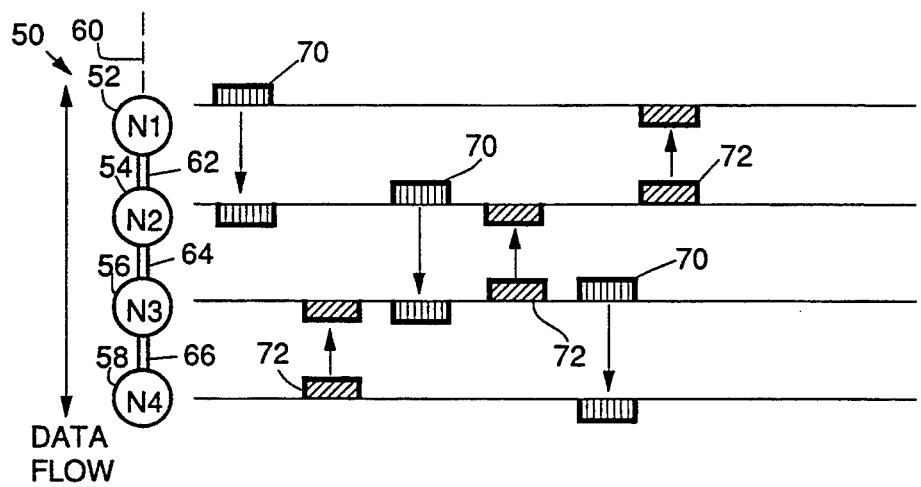
FIG. 1 is a simplified schematic diagram of a communications network embodying the invention for achieving duplex data flow, and time slot assignment for the network.

A simplified time division multiple access (TDMA) communication network 50 embodying this invention is illustrated in FIG. 1. In this exemplary embodiment, the network comprises four communications devices 52, 54, 56 and 58 spaced along a communications path 60 at nodes N1-N4, respectively. Respective communications links 62, 64 and 66 allow data communication between adjacent nodes N1-N2, N2-N3 and N3-N4. An exemplary application for the network is the train control and position locating system described in the above referenced application. The communications devices in the network located on the bus include the wayside radios located at fixed locations along the track in this example.

The TDMA network 50 employs synchronous and interrogate-respond communications techniques, along with packetized data bus techniques. The communication devices 52–58 in this exemplary network embodiment are spread spectrum RF wireless radios, and the communications links include antennas for wireless transmission of RF signals, as described in more detail in the referenced pending application Ser. No. 08/063,097.

In accordance with the invention, the network 50 is a synchronous, time-slotted structure, wherein the time slot length(s) and sequencing are known to each of the communications devices 52–58. The network is characterized by an arrangement of coordinated time slot functional assignments, which provides for duplex data flow at each communication device. In each time slot, a communications device may either send or receive one data packet. Thus, in each time slot, one data packet is transferred from a communications device, i.e., a node, to an adjacent node. The same (or a modified) data packet is transferred to the next node in a chained sequence along the communications path 60 in a later time slot.

The data flows in both directions, in a time interleaved manner, to form a duplex data flow or data bus, as shown in FIG. 1. Thus, at time slot 1, device 52 transmits a data packet 70 to adjacent device 54 along the path 60. At time slot 2, device 58 transmits data packet 72 in the opposite direction to device 56. At time slot 3, device 54 retransmits data packet 70 to adjacent device 56. At time slot 4, device 56 retransmits packet 72 to device 54. At time slot 5, device 56 retransmits packet 70 to device 58. At time slot 6, device 54 retransmits packet 72 to device 52. In this manner, duplex data flow over the network is achieved.

Figure 2:
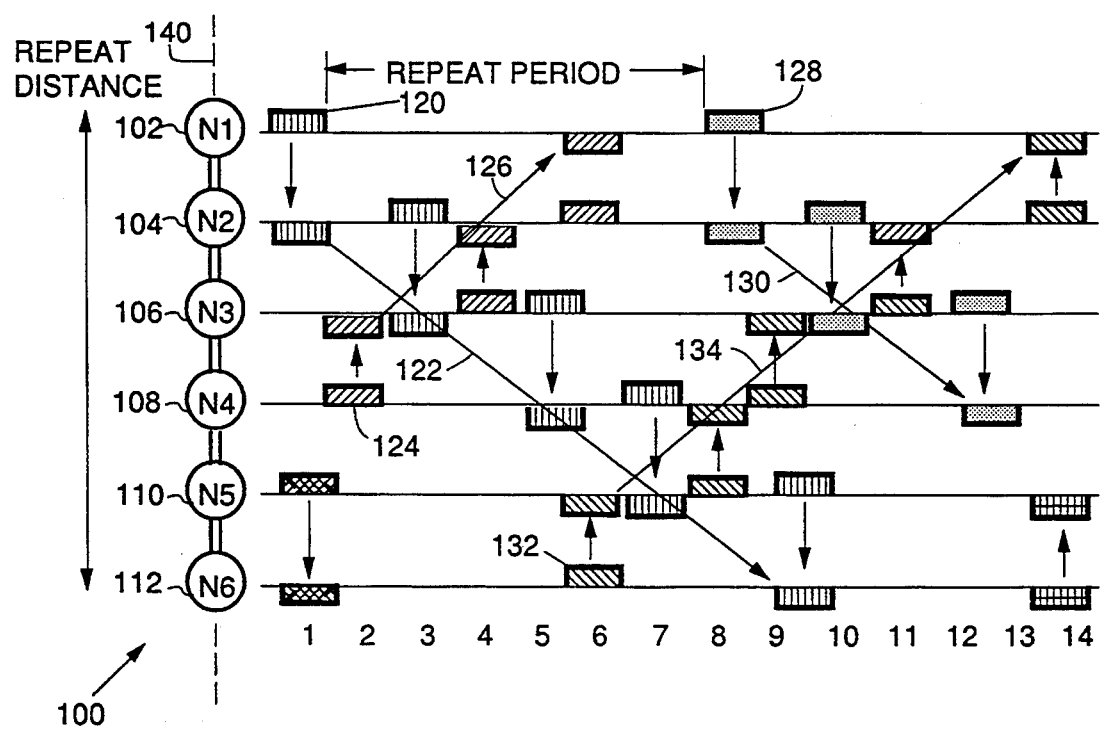
FIG. 2 is a simplified schematic diagram of an alternate embodiment of a network in accordance with the invention, including a timing diagram illustrating the repeat period and distance for the network.

The data flow in each direction is repeated after several time slots. In the example of FIG. 2, comprising communications devices 102–112, the repeat period is eight time slots, and the corresponding repeat distance is four nodes. Each packet can be thought of as flowing along a moving window, at a diagonal in this two dimensional space, and the space between consecutive packets can be considered a moving window. Thus, data packet 120 flows along diagonal 122, data packet 124 flows along diagonal 126, data packet 128 moves along diagonal 130 and data packet 132 moves along diagonal 134. The window spacing is then equal to the repeat period or the repeat distance. In some implementations, the repeat distance can be as short as two nodes.

Clearly, the window timing is different for each communication device 102–112 along the data path or bus 140 in FIG. 2. For example, a downward flowing window occurs four time slots later for device 108 than it does for device 104, while the time relationship is reversed for an upward flowing window. However, if all of the devices on the bus 140 have a common time-location reference, the time of each window can be simply calculated. For this bus, it is thus natural to make and store assignments by window number.

In the simplest case, a device or node performs the same set of functions for each window in the same direction. For the example of FIG. 2 device 104 receives in time slot 1 and, if a valid data packet is received, relays the received data packet in time slot 3. Device 104 performs the same sequence of functions starting in time slot 9, and every eight time slots thereafter. Device 104 performs the identical sequence, but with a fixed time offset of one time slot, to relay data packets in the upward direction. The time slot assignments for this example are given by the following equations:

*Receive for upward relay at time slots* $= 8\,w - 2\,L$

*Transmit for upward relay at time slots* $= 8\,w - 2\,L + 2$

*Receive for downward relay at time slots* $= 8\,w + 2\,L - 11$

*Transmit for downward relay at time slots* $= 8\,w + 2\,L - 9$ where w=window number and L=level number, starting with device 102 as level 1, device 104 as level 2, etc.

For this exemplary bus architecture, the time relationships are fixed, and this simplifies the assignment process. Thus, if device 104 is time synchronized and knows its position along the bus 140, it need only be assigned to relay in all windows and to use a specific transmission code and frequency channel.

A communications network in accordance with the invention further includes a means for controlling the direction, speed and extent of data flow. Time, frequency or code multiplexing may, in a general sense, be used to control which pairs of devices are communicating in a given time slot. In the exemplary network of FIG. 2, device 104 is receiving in time slot 1 while both devices 102 and 110 are transmitting. If due to geometry and propagation, the signal arriving at device 104 from device 110 is too large, then additional isolation may be needed to assure that device 104 receives only from device 102 during this time slot. In this context, a signal arriving at device 104 from device 110, for example, would be too "large" if it interfered with or blocked reception of the signal simultaneously arriving at device 104 from device 102. If equipment capabilities and frequency allocations allow, this isolation can be assured by using unique frequency channels for each potentially simultaneous transmission in the same area. When this is not practical, transmission coding, e.g., direct sequence spread spectrum coding, can be used to assure circuit isolation.

Figure 3:
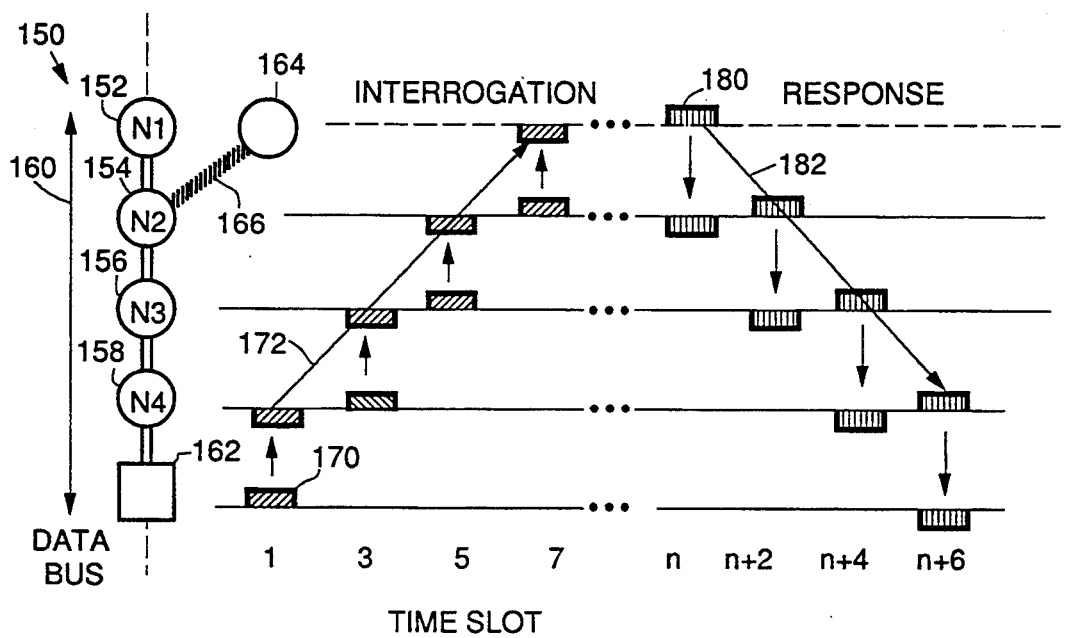
FIG. 3 illustrates a communications network employing an off-bus interrogate-respond mode of operation in accordance with the invention.

The communications network includes a means of interrogating and obtaining responses from the data bus devices or nodes, as well as from other communications devices which are not data bus nodes, e.g., devices on moving vehicles. Control nodes can initiate an addressed interrogation packet along the data bus to a node device, and the node device responds with a data packet, as shown in FIG. 3. Here, the communication network 150 comprises a plurality of communication devices or nodes 152–158 located along data bus 160, a control device or node 162 and an off-bus communication device 164. In this example, the control device 162 is located on the bus 160. For the implementation described in the above-referenced application, the off-bus device 164 could be a train radio, since the train radios are not normally given relay assignments, and their relay level along the bus is continuously changing. Both the control device 162 and the responding device 164 initiate flow on the bus 160 by sending a packet in a time slot that matches the synchronous transfer in the desired direction, i.e., the packet is transmitted in a time slot for which the desired relay devices(s) is listening for potential relay in the correct direction. For example, in FIG. 3, device 154 is listening in time slot n for a packet for relay in the inbound (downward) direction. Thus device 164 transmits in this time slot to initiate the inbound transfer. Device 164 calculates this slot based on prior knowledge of the bus relay assignments for device 154, and based on recent reception from device 154. If device 164 had more reliable contact with device 152, then device 164 could have chosen to transmit in time slot n−2, to achieve the same synchronous transfer.

To further illustrate the relaying operation, say control device 162 initiates an interrogation packet 170 in time slot 1, which is relayed along diagonal 172 in successive time slots 3 and 5 to device 154. Device 154 in turn relays the interrogation packet to device 164 along communication link 166 in time slot 7. During a subsequent time slot n, a response packet 180 is transmitted to device 154, which in turn relays the packet along diagonal 182 in subsequent time slots n+2, n+4 and n+6 to the control device 162. In this example, the control device 162 need not know the exact location or "connectivity" of the interrogated device 164; i.e., the control device 162 does not need to know whether the best connection of device 164 is to device 152 or 154 or 156. By assigning the response to the desired inbound window, device 164 will choose the best (most reliable) contact, and will then transmit the response in the appropriate calculated time slot. Thus the control node merely needs to know which bus the off-bus device has contact with, in order to assign the response window. The responding device can better choose the time slot, since it is observing the local communications and continuously evaluating its own connectivity to the bus device. By sending an addressed interrogation in any available assigned window and commanding the response at any later open window number, the responding device 164 can calculate the time slot for the response, which is applicable to its local view of the network.

A network in accordance with the invention is further capable of acquiring and maintaining time synchronization. Any network in accordance with the invention will typically have a built-in mechanism for time synchronization. One exemplary mechanism for implementing this function can include the measurement of time of arrival of transmissions by each previously synchronized node. The acquisition and synchronization transmissions can be normal data packets, or the transmissions can be transmitted as separate packets. As an example, every sixteenth time slot can be allocated for special network functions including initial acquisition into the network, obtaining time of day, refining time synchronization, identifying the local nodes (i.e., direct communications), and learning the local network structure. Acquisition and clock offset measurements are further described in pending application Ser. No. 08/063,097.

Figure 4:
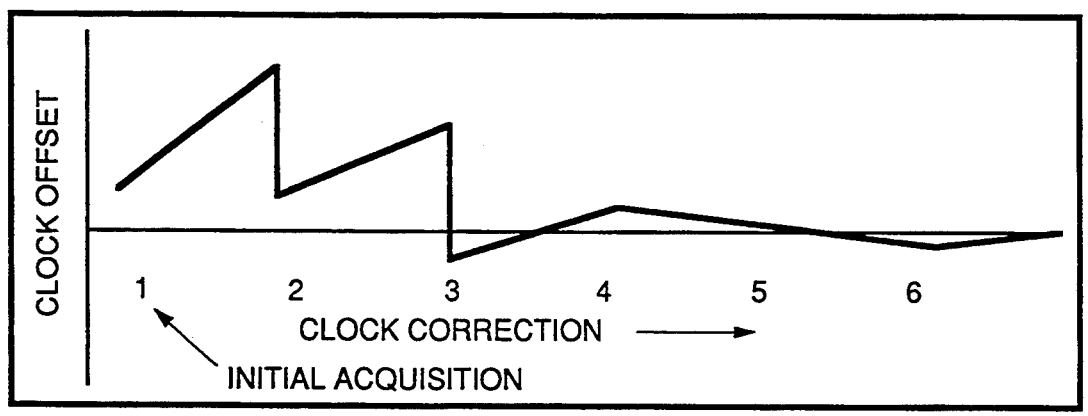
FIG. 4 illustrates clock synchronization utilized by the communications devices in the communications network.

An exemplary clock synchronization sequence is shown in FIG. 4. In this example, the acquiring communication device on the data bus has initial positive clock and drift offsets. For clock correction cycles 2 and 3, the measured offset is sufficiently large that both time and frequency corrections are made. For later correction cycles, only a small frequency correction is made, to keep this newly acquiring device time synchronized to other communications devices in the network. As an example, each correction cycle uses two of the time slots dedicated to acquisition. In the first of these time slots, the acquiring device transmits and a device which is already time stabilized in the network measures the signal time of arrival (TOA). In the second of these time slots, the time stabilized device sends the measured TOA, and the acquiring device measures the TOA of this data packet. The acquiring device calculates its clock offset using the method described in application Ser. No. 08/063,097. If the calculated offset is larger than a preset value (e.g., 10 microseconds), the acquiring device corrects its clock offset and its clock frequency. However, if the offset is less than the preset value, the acquiring device corrects only its clock frequency. After a few correction cycles, when the time offsets become consistently small, the acquiring device declares itself time stabilized, and it may then be used by later acquiring devices.

Blocks of time slots are allocated and assigned to particular communications devices and circuits comprising the network, in accordance with the invention. FIG. 5 depicts an exemplary allocation of blocks of time-space resource, for a simple bus with twelve nodes and eight windows, to one major and three minor circuits. In this example, node 1 is a major control node with the majority of the resource under its control. In addition, blocks of resource have been allocated for communications from node 7 to node 12 (block A), from node 10 to node 12 (block B), and from node 5 to node 9 (block C). In FIG. 5, "Tu" and "Td" indicate that the node is a terminal point for communications in the upward or downward direction, respectively, and "R" indicates that the node is a relay for that window. Additionally, all assignments are assumed to apply to both directions of flow, and thus they show only once in FIG. 5, and require only one command. In this example, window numbering is assumed to be repeated using modulo 8 arithmetic.

FIG. 6 depicts the set of assignments for the example bus of FIG. 5. In this example, three of the nodes (levels 1, 2, and 3) perform only one class of function for one circuit, and thus, they need only be given one assignment. In this example, it is assumed that the different circuits use unique transmission codes and/or frequency channels for isolation. The other nodes require three or four commands each.

The window assignments in the examples of FIG. 6 can be readily mapped to time slot usage by the individual nodes. Each command covers $2^n$ windows, and the windows are uniformly spaced. For example, the first command for the node at level 5 (node 5) covers all four even numbered windows. Node 5 would thus perform both the upward and downward relay functions for each of the even numbered windows.

A network in accordance with the invention may utilize as the communications devices wireless radios employing spread spectrum signaling, as described in application Ser. No. 08/063,097, for signal isolation and to improve the time synchronization. This is especially likely when position location is part of the intended application, as in the referenced co-pending application.

The network in accordance with the invention can include a synchronized mix of scheduled and interrogate-respond data transfers using the same data bus. In the example of FIG. 5, data transfers within boxes A, B and C may be used for synchronous full duplex data circuits, while the data transfers within boxes D–G may be used for a combination of synchronous simplex reporting from various nodes to the control node (node 1), Interrogations by node 1, and the corresponding responses.

Two or more time division multiplexed data buses can use the same nodes; e.g., two independent control nodes can share a subset of the same nodes in a time division multiplexed fashion. As an example, in FIG. 5, node 9 could be set up as a control node for block F and node 1 could remain the control node for blocks D, E and G.

Figure 7:
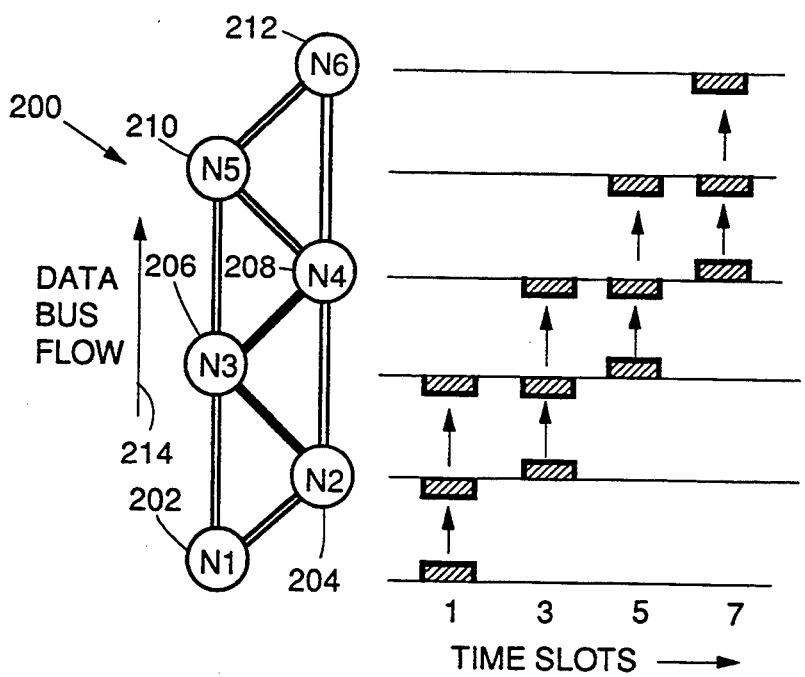
FIG. 7 is a simplified schematic block diagram and data flow diagram for a communication network configured to provide redundant data bus flow.

Redundant data bus configurations can be employed for reliability. In some vehicle control applications, both message transfer time and reliability of delivery are critical. In FIG. 7, a network 200 comprises communications devices 202–212 located along data bus 214. In the example of FIG. 7, the network geometry is designed such that each node is assured to be directly connected to two adjacent nodes in each direction, and each node listens for transmissions from the prior two nodes. For the example of a packet being sent from device 202 to device 212, device 208 may receive the packet from device 204 in time slot 3 and/or from device 206 in time slot 5. The transfer of data from device 202 to device 212 will proceed on schedule despite the failure of any single link or device node, other than the source and destination nodes. Thus, the short term performance of this network is unaffected by failure of single components. In combination with a procedure for detection, reporting and repair of failed elements, this can form the basis for a highly reliable communications bus.

Figure 8:
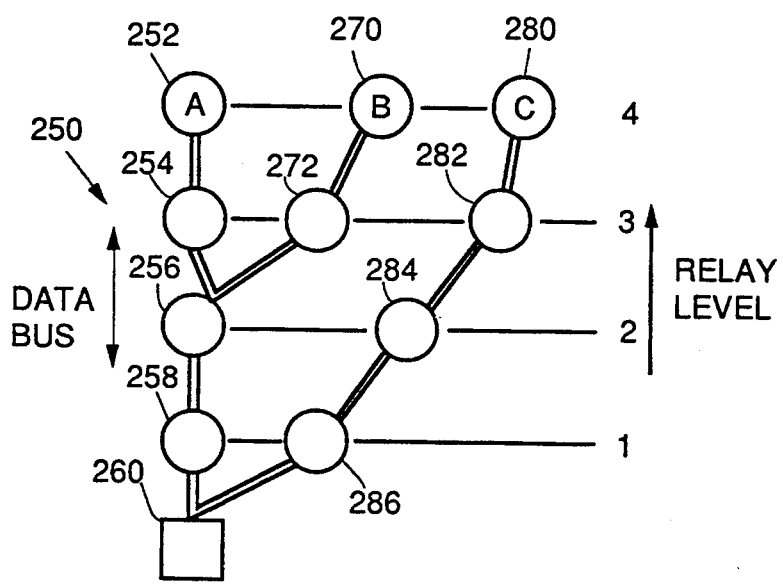
FIG. 8 is a simplified schematic block diagram and data flow diagram showing a network employing a branched interrogate-respond data bus.

Branched data busses can be employed, as shown in FIG. 8. The network 250 comprises three data busses A, B and C. Data bus A comprises communication devices 252–260. Bus B comprises devices 270, 272 and 256–260. Bus C comprises devices 280–286 and 260. In this example, an interrogation addressed to device 270 would flow from the control device 260 to devices 252, 270 and 280 at the fourth relay level. Then since only device 270 was addressed, the response would flow from device 270 back to the control device 260. The routing at the branch points may be any combination of flooding, directed routing by indicators within the data packets, or pre-planned synchronous techniques. If the routing from device 260 to device 270 is by addressed flooding, then only device 270 (and not devices 252 or 280) will initiate a response. Thus, only the devices on bus B will relay the response.

Figure 9:
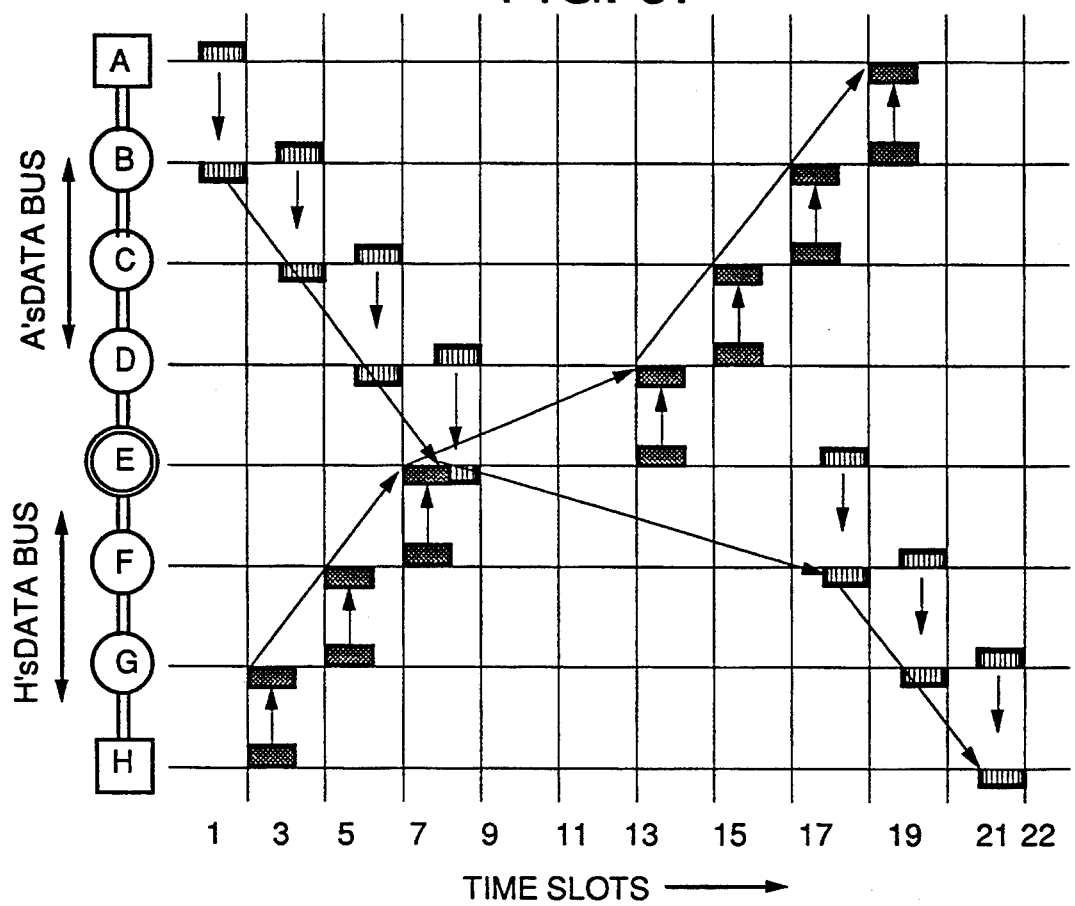
FIG. 9 is a simplified schematic block diagram and data flow diagram showing inter-network data flow between two communications networks.

In larger system application, inter-network communications via either synchronous circuits or store and forward gateways could be set up to allow coordination among control nodes. In the example of FIG. 9, control node A and control node H are exchanging data, using node E as a store and forward relay. In this case, node E is assigned to participate on control node A's data bus one half of the time and on control node H's data bus the other half. Data packets to be transferred from A's data bus to H's data bus are received by node E on an assigned window for A's data bus and stored until the next assigned window on H's data bus. In FIG. 9, node E receives a data packet from node A in time slot 7 and stores it until time slot 17, when it forwards the packet on toward node H.

This invention combines the best features of asynchronous interrogate-respond (I-R) and synchronous time-slotted systems, along with packetized data bus techniques, to provide a significant advantage in several applications. The invention allows a combination of dedicated synchronous communications circuits and local networks to co-exist with flexible I-R networks time sharing the same communications devices. The synchronous, time-slotted architecture allows easy and efficient integration of security measure, as well as the easy inclusion of virtual circuits. In this context, a "virtual circuit" is any grouping of time division multiplexed time slot assignments between user terminals, such that the users can view it as a physical circuit. A virtual circuit may be either activated for a specific time duration, or it may remain activated until a later action is taken to deactivate it. The latter category is referred to as a permanent virtual circuit (PVC). The virtual circuits can be readily set up either for fixed periods or as permanent virtual circuits PVCs.

The interrogate-respond architecture allows rapid response to changes in loading and rapid network restructuring. It is especially applicable where fast recovery from unplanned events is necessary from centralized control node(s). For an exemplary data bus, tailored for train control, at peak loading about 75% of the windows inbound to the control node will be assigned as PVCs for location and status data from the trains (which are off the bus), and the remaining 25% are available for responses to interrogations. The PVCs provide a high capacity with a minimum of dedicated resource, but a report is occasionally missed due to the nature of mobile radio links in a noisy environment. Whenever a report is missing, the control node interrogates the train radio to obtain a repeat or additional data, using the first available window. This invention allows efficient integration of this combination of PVCs and interrogate-respond transactions over a single synchronous data bus with many levels of relay and moving users. The data bus techniques allow essentially unlimited relaying, without the inefficiency of flooding techniques.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A data communications network, comprising:
  a network of communications devices for communication over a communications medium, said devices spatially separated and arranged along a communication path;
  means for maintaining time synchronization among said communication devices;
  an arrangement of coordinated time slot functional assignments, wherein a predetermined communication device can send or receive a data packet during a given time slot;
  means for successively propagating in alternating time slots a first data packet along said path in a first direction from device to adjacent device and for propagating a second data packet along said path in a second direction from device to adjacent device in alternating time slots in a multi-level data relay, comprising:
    means for relaying said first data packet from a first device to an adjacent device during a first time slot, said relaying of said first packet occurring in a first direction along said path;
    means for relaying said second data packet from a second device to a device adjacent to said second device during a second time slot, said relaying of said second packet occurring in a second direction along said path;

means for relaying said first data packet in said first direction along said path during a third time slot to yet another device; and means for relaying said second data packet in said second direction along said path during a fourth time slot to a further device;

wherein data packet flow occurs in both said first and second directions along said path in a time interleaved manner to form a multi-level duplex data flow.

2. The network of claim 1 wherein said communications devices are arranged to provide a repetitive duplex data flow along said path, wherein the data flow in each direction is repeated after a repeat period defined by a predetermined number of time slots.

3. The network of claim 1 wherein two devices are permitted to transmit or receive simultaneously during a particular time slot.

4. The network of claim 3 further comprising isolation means for preventing data transmitted by one of said two devices during said time slot from being received within a given area by a network device other than an intended recipient.

5. The network of claim 4 wherein said isolation means comprises means for assigning unique frequency channels for each potentially simultaneous transmission within a given area.

6. The network of claim 4 wherein said isolation means comprises transmission coding means for transmitting said data packets from one device to another within a given area.

7. The network of claim 1 further comprising a control node, and means for interrogating and obtaining responses from particular communications devices, wherein said control node issues an interrogation data packet addressed to a particular interrogated communications device, said network propagates said interrogation data packet along said data path to said particular device, and wherein said interrogated device issues a response data packet in a subsequent time slot in a return data propagation direction, wherein said response data packet is propagated along said data path back to said control device.

8. The network of claim 7 wherein said interrogate data packet comprises a data packet address identifying said interrogated communication device.

9. The network of claim 7 further comprising one or more off bus communication devices which are not assigned time slots within said network.

10. The network of claim 1 further comprising a redundant bus configuration, wherein each device is connected to two other devices in each direction along said data path, and each device listens for transmissions from two prior devices.

11. The network of claim 1 wherein said bus is configured as a branched bus comprising a plurality of data bus segments meeting at branch points.

12. A method for data communications in a network of communication devices spatially separated and arranged on a data bus, comprising a sequence of the following steps:

providing a network of communications devices, each capable of transmitting and receiving data packets on the data bus, each device comprising a real time clock;

maintaining time synchronization among real time clocks comprising said devices;

assigning particular time slots to said communication devices within a coordinated time slot structure, wherein a predetermined communications device can send or receive a data packet during a given time slot, said time slot assignments designed to permit a data packet to be relayed by said devices along the data bus in either direction in chained sequence;

successively propagating in alternating time slots a first data packet along said data bus in a first direction from device to adjacent device and for propagating a second data packet along said data bus in a second direction from device to adjacent device in a multi-level data relay, said propagating step comprising:

relaying said first data packet from a first device to an adjacent device during a first time slot, said relaying of said first packet occurring in a first direction along said data bus;

relaying said second data packet from a second device to a device adjacent to said second device during a second time slot, said relaying of said second packet occurring in a second direction along said data bus;

relaying said first data packet in said first direction along said data bus during a third time slot to yet another device; and relaying said second data packet in said second direction along said data bus during a fourth time slot to a further device;

wherein data packet flow occurs in both directions along the data bus in a time interleaved manner to form a multi-level duplex data flow along the data bus.

13. The method of claim 12 wherein said time slot assignment structure includes repetitive windows each comprising a block of time slots, wherein the data flow in each direction along the data bus is repeated after a repeat period defined by the number of time slots between the start of said windows.

14. The method of claim 12 wherein wherein two or more devices are permitted to transmit or receive during the same time slot.

15. The method of claim 14 wherein said devices comprise radio sets for transmitting and receiving said data packets via a wireless RF communications link, and said two or more devices permitted to transmit or receive simultaneously during a given time slot are assigned different RF frequency channels for relaying said data packet during said given time slot, thereby preventing a data packet transmitted by one of said two devices during said given time slot from being received within a given area by a communication device other than an intended recipient.

16. The method of claim 14 wherein said devices comprise radio sets for transmitting and receiving said data packets via a wireless RF communications link, and said radio sets employ transmission coding for transmitting data packets from one device to another within a given area.

17. The method of claim 12, wherein said network further includes a control communication device, and said method further comprises the steps of interrogating and obtaining responses from particular communications devices, wherein said control device issues an interrogation data packet addressed to a particular interrogated communications device, said interrogation data packet is relayed along the data bus to said particular device, and wherein said interrogated device issues a response data packet in a subsequent time slot in a return data propagation direction, wherein said response data packet is propagated along said data path back to said control device.

18. The method of claim 17 wherein said interrogate data packet comprises a data packet address identifying said interrogated communication device.

19. The method of claim 17 wherein said interrogated communication device is off the data bus and is not assigned time slots within said network.

20. The method of claim 12 wherein each device is connected to two other devices in each direction along the data bus, and each device listens for transmissions from two prior devices during its assigned time slots.

21. The method of claim 12 wherein the data bus is configured as a branched bus comprising a plurality of data bus segments meeting at branch points.

22. A data communications network, comprising:
a network of communications devices for communication over a communications medium, said devices spatially separated and arranged along a communication path, said network comprising means for maintaining time synchronization among said devices, said communications devices arranged to provide a repetitive duplex data flow along said path, and wherein two of said devices are permitted to simultaneously transmit or receive during a particular time slot;
an arrangement of coordinated time slot functional assignments, wherein a predetermined communication device can send or receive a data packet during a given time slot;
means for successively propagating a first data packet along said path in a first direction from device to adjacent device and for propagating a second data packet along said path in a second direction from device to adjacent device in alternating time slots, comprising means for relaying said first data packet from a first device to an adjacent device during a first time slot, said relaying of said first packet occurring in a first direction along said path; means for relaying said second data packet from a second device to a device adjacent to said second device during a second time slot, said relaying of said second packet occurring in a second direction along said path, wherein data packet flow occurs in both directions along said path in a time interleaved manner to form a duplex data flow; and
isolation means for preventing data transmitted by one of said two devices during a given time slot from being received within a given area by a network device other than an intended recipient, said isolation means comprises transmission coding means for transmitting said data packets from one device to another within said given area, said transmission coding means comprising direct sequence spread spectrum coding means.

23. A method for data communications in a network of communication devices spatially separated and arranged on a data bus, comprising a sequence of the following steps:
providing a network of communications devices, each capable of transmitting and receiving data packets on the data bus, each device comprising a real time clock, and wherein said devices comprise radio sets for transmitting and receiving said data packets via a wireless RF communications link, and said radio sets employ direct sequence spread spectrum transmission coding for transmitting data packets from one device to another within a given area;
maintaining time synchronization among real time clocks comprising said devices;
assigning particular time slots to said communication devices within a coordinated time slot structure, wherein a predetermined communications device can send or receive a data packet during a given time slot, said time slot assignments designed to permit a data packet to be relayed by said devices along the data bus in either direction in chained sequence, and wherein two or more devices are permitted to simultaneously transmit or receive during a given time slot;
successively propagating a first data packet along said data bus in a first direction from device to adjacent device and for propagating a second data packet along said data bus in a second direction from device to adjacent device in alternating time slots in a multi-level data relay, comprising relaying said first data packet from a first device to an adjacent device during a first time slot, said relaying of said first packet occurring in said first direction along said data bus, relaying said second data packet from a second device to a device adjacent to said second device during a second time slot, said relaying of said second packet occurring in said second direction along said data bus, relaying said first data packet in said first direction along said data bus during a third time slot to yet another device, and relaying said second data packet in said second direction along said data bus during a fourth time slot to a further device, wherein data packet flow occurs in both directions along the data bus in a time interleaved manner to form a multi-level duplex data flow along the data bus.

24. A data communications network, comprising:
a network of communications devices for communication over a communications medium, each of said devices comprising a wireless radio set for transmission and reception of spread spectrum encoded signals, said devices spatially separated and arranged along a communication path, said network comprising means for maintaining time synchronization among said devices;
an arrangement of coordinated time slot functional assignments, wherein a predetermined communication device can send or receive a data packet during a given time slot;
means for successively propagating a first data packet along said path in a first direction from device to adjacent device and for propagating a second data packet along said path in a second direction from device to adjacent device in alternating time slots in a multi-level data relay comprising means for relaying said first data packet from a first device to an adjacent device during a first time slot, said relaying of said first packet occurring in said first direction along said path, means for relaying said second data packet from a second device to a device adjacent to said second device during a second time slot, said relaying of said second packet occurring in said second direction along said path means for relaying said second data packet in said second direction along said path during a fourth time slot to a further device means for relaying said first data packet in said first direction along said path during a third time slot to yet another device, and means for relaying said second data packet in said second direction along said path during a fourth time slot to a further device, wherein data packet flow occurs in in a time interleaved manner to form a multi-level duplex data flow.

* * * * *